(12) United States Patent
Yeakley

(10) Patent No.: US 6,194,796 B1
(45) Date of Patent: Feb. 27, 2001

(54) LONG-STROKE VOICE COIL LINEAR ACTUATOR

(75) Inventor: Lester Yeakley, Esters Park, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/449,291

(22) Filed: Nov. 24, 1999

(51) Int. Cl.⁷ .................................................. H02K 41/00
(52) U.S. Cl. ................................................. 310/14; 310/12
(58) Field of Search ................................... 335/302, 306; 310/12, 13, 14

(56) References Cited

U.S. PATENT DOCUMENTS

| 5,008,578 | * | 4/1991 | Pace | 310/256 |
| 5,267,111 | * | 11/1993 | Nishimura et al. | 360/106 |
| 5,434,458 | * | 7/1995 | Sturat et al. | 310/13 |

* cited by examiner

Primary Examiner—Elvin Enad
Assistant Examiner—Judson H. Jones
(74) Attorney, Agent, or Firm—Duft, Graziano & Forest; Wayne P. Bailey

(57) ABSTRACT

A voice coil linear actuator includes a bobbin connected to a voice coil, a center pole piece, a main magnet, and an outer pole and housing. An auxiliary magnet is constructed and arranged for attachment to the center pole piece such that the center pole piece is sandwiched between the auxiliary magnet and the main magnet. The main magnet has a first magnetic polarization (e.g., North) adjacent to the center pole piece at a first end of the main magnet. The auxiliary magnet has a second magnetic polarization (e.g., North) adjacent the center pole piece, such that fringing fields from the auxiliary magnet substantially cancel fringing fields from the main magnet. Consequently, substantially all fringing fields from the actuator are substantially contained with the actuator. Fields at the magnetic head in a tape drive unit are less than about five Orsted. A non-magnetic spacer can be coupled to a second end of the main magnet to alter the force exerted by the bobbin as a function of current through the winding, such that the actuator can replace existing actuators in form, fit and function, though with improved performance.

11 Claims, 6 Drawing Sheets

LONG-STROKE VOICE COIL LINEAR ACTUATOR

FIELD OF THE INVENTION

The invention relates to linear actuators, and particularly to a voice coil linear actuator for long stroke actuation in a tape drive unit.

BACKGROUND OF THE INVENTION

Linear voice coil motors in tape drive systems are known. For example, the 9840 tape drive system from Storage Technology uses magneto-restrictive (MR) elements in its read/write head and a voice coil linear actuator to position the head with respect to the tape. This type of tape head does not tolerate a large external magnetic field as it operates to sense magnetic fields on the surface of the tape. Specifically, it is desirable to keep the magnetic field in the vicinity of the read/write head below five Orsted.

One problem with the prior art voice coil linear actuator is it produces a relatively large fringing field (approximately forty Orsted) at the bottom of the head, even with magnetic shielding. Consequently, prior art voice coil linear actuator systems effectively permit only a short stroke to traverse a linear track of about 0.015 inch. While this is fine for tape drive systems that record in one tape band, with the head spread over the entire tape width; this short stroke is not sufficient for recording in two bands to span a distance of nearly 0.300 inch. Furthermore, systems that record in two tape bands require a much larger linear actuator in order to provide performance in linear torque over the entire distance. By contrast, the short stroke prior art actuators translate almost entirely within the actuator.

One object of the invention is thus to provide a long stroke voice coil linear actuator. Another object of the invention is to provide a voice coil linear actuator for the 9840 Eagle Drive system by Storage Technology, with reduced magnetic fringing from the actuator.

These and other objects will become apparent in the description that follows.

SUMMARY OF THE INVENTION

Certain background is useful in understanding the invention, and thus the following patents are incorporated herein by reference: U.S Pat. No. 5,793,574, U.S. Pat. No. 5,644,453; U.S. Pat. No. 5,627,702; U.S. Pat. No. 5,434,458; U.S. Pat. No. 5,146,122; U.S. Pat. No. 4,833,558; U.S. Pat. No. 4,747,004; U.S. Pat. No. 4,559,571; U.S. Pat. No. 4,602,175; U.S. Pat. No. 4,528,607; U.S. Pat. No. 4,393,425; U.S. Pat. No. 4,190,870; and U.S. Pat. No. 4,003,092.

The invention of one aspect provides a voice coil linear actuator that has reduced magnetic fringing and that has substantially the same form-fit shape as prior art actuators to maintain operable interface with other mechanical elements, such as the Head Position Servo, in the tape drive system. According to one aspect, leakage flux at the top of the actuator is reduced by an auxiliary magnet that substantially cancels magnetic fields at the read/write head (i.e., to less than about two Orsted). With reduced fringing, the main magnet size is reduced from conventional sizes and the voice coil is repositioned to achieve the forces needed and/or desired during translation.

In one aspect, the invention provides an improvement to a voice coil linear actuator of the type that includes a bobbin connected to a voice coil, a center pole piece, a main magnet, and an outer pole and housing. An auxiliary magnet is constructed and arranged for attachment to the center pole piece such that the center pole piece is sandwiched between the auxiliary magnet and the main magnet. The main magnet has a first magnetic polarization adjacent to the center pole piece at a first end of the main magnet; and the auxiliary magnet has a second magnetic polarization adjacent the center pole piece, such that fringing fields from the auxiliary magnet substantially cancel fringing fields from the main magnet.

In another aspect of the improvement, the first magnetic polarization has a North orientation and the second magnetic polarization has a North orientation.

In still another aspect of the improvement, a non-magnetic spacer is coupled to a second end of the main magnet to alter the force exerted by the bobbin as a function of current through the winding.

In another aspect, a voice coil actuator is provided, including:

a substantially cylindrical outer pole and housing having a first hollow interior along a force axis; a substantially cylindrical voice coil having a winding about a second hollow interior and axially disposed along the force axis in the first hollow interior; a substantially cylindrical main magnet axially disposed along both interiors, the main magnet having a first end with a first magnetic polarization and a second end with a second magnetic polarization; a substantially cylindrical center pole piece adjacent the first end of the main magnet and axially disposed along both interiors; a substantially cylindrical auxiliary magnet axially disposed along both interiors and adjacent to the center pole piece, wherein the pole piece separates the auxiliary magnet from the main magnet, a bobbin connected to the voice coil for translation with the voice coil along the force axis, wherein current through the voice coil generates a force on the bobbin along the force axis, magnetic fringing fields from the auxiliary magnet and the main magnet being substantially canceled external to the actuator.

Preferably, voice coils of the invention generate less than about five Orsted of magnetic flux external to the actuator at the point of a tape drive read/write head.

The invention also provides a method for attenuating external magnetic fringing fields of a voice coil linear actuator that moves a bobbin along a force axis, including the steps of:

shielding a main magnet within the actuator with an auxiliary magnet disposed between the bobbin and the main magnet; and extending an outer pole housing of the actuator to shield windings of the voice coil.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
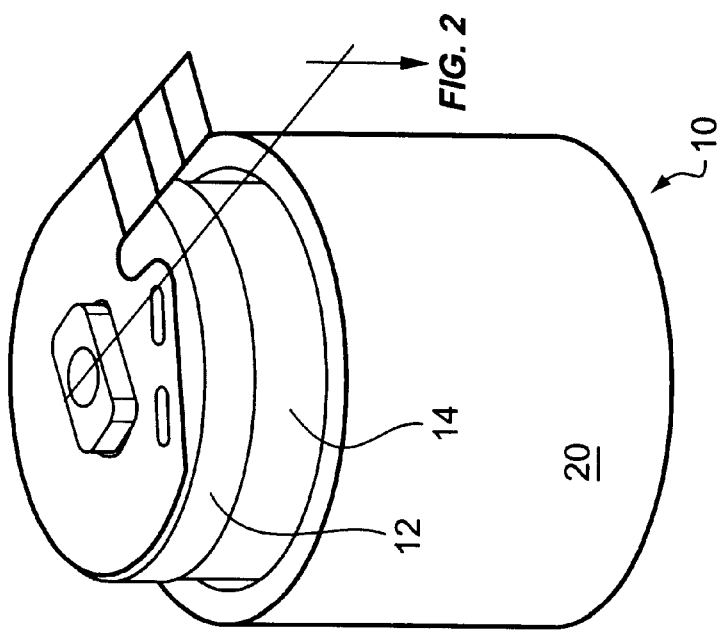
FIG. 1 shows a prior art perspective view of a voice coil motor.
Figure 2:
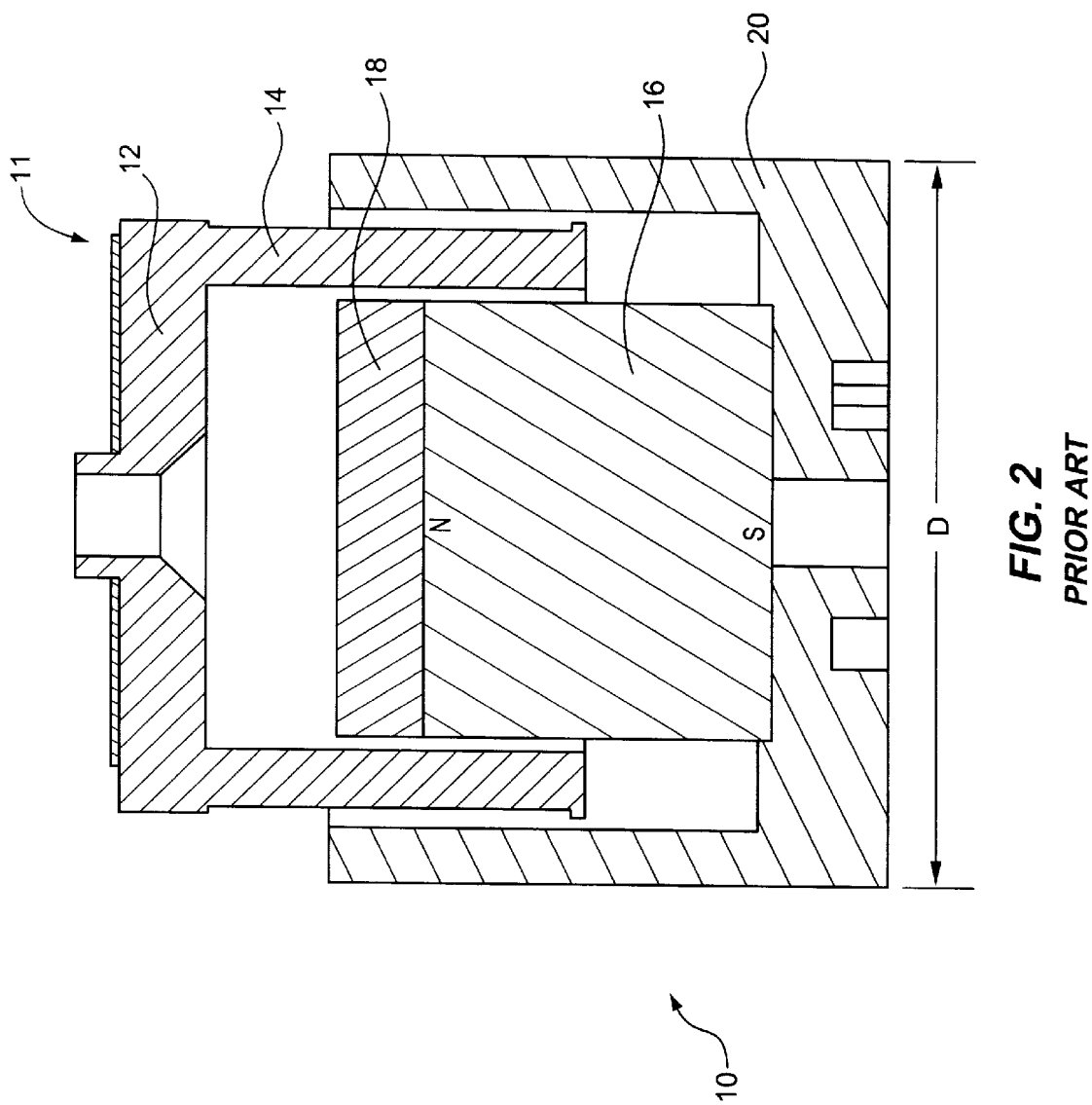
FIG. 2 shows a cross-sectional view of the motor of FIG. 1.

FIG. 1 shows a perspective view of a prior art voice coil motor 10 that provides linear actuation in a tape drive system. FIG. 2 shows a cross-sectional view of motor 10. As known in the art, motor 10 includes a voice coil bobbin 12 with a winding shown as voice coil 14. Motor 10 is cylindrical in shape, with a diameter D of approximately one inch, and is surrounded by the outer pole and housing 20. The main magnet 16 resides in the middle of cylindrical motor 10, and is capped by center pole piece 18.

Figure 5:
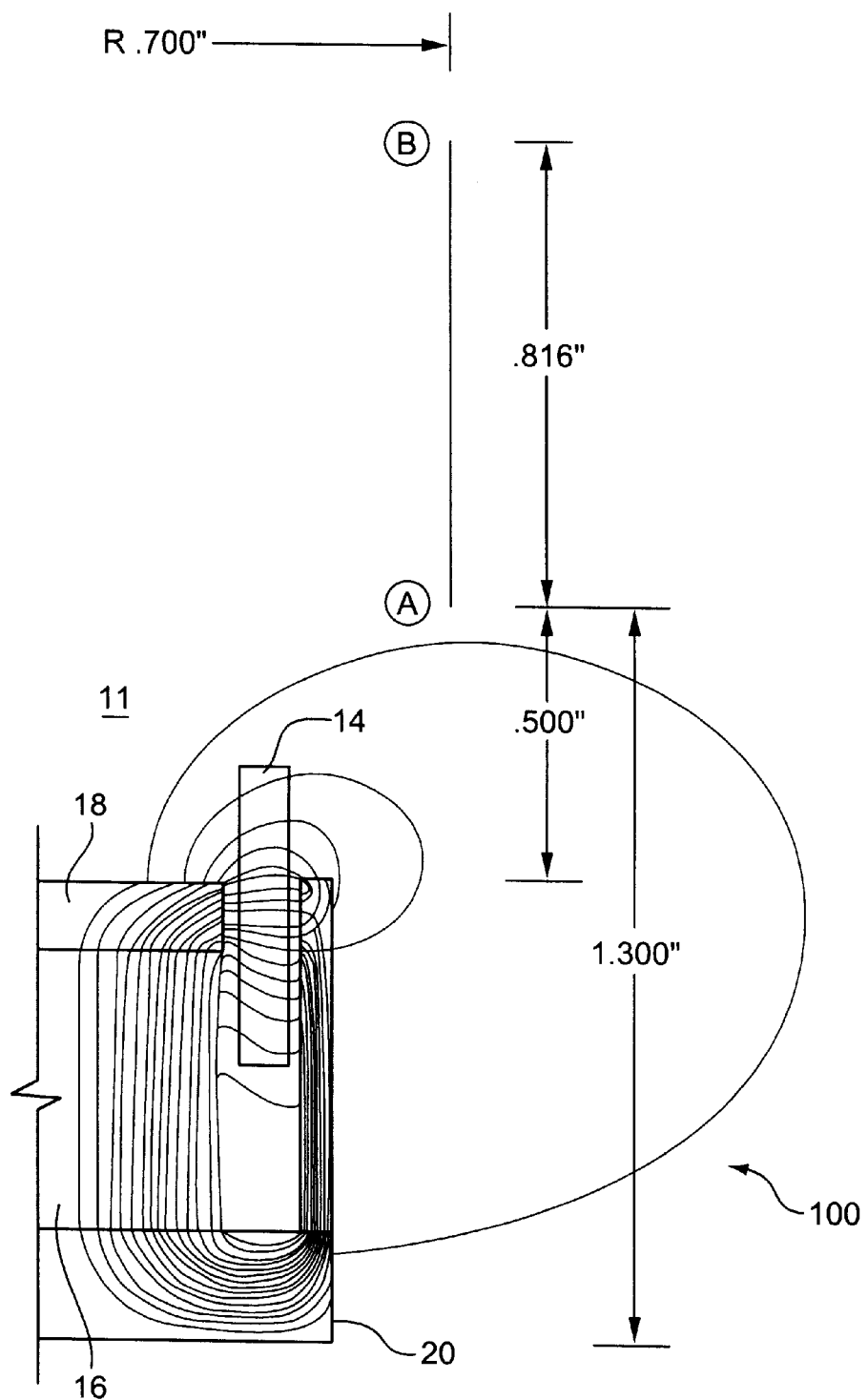
FIG. 5 illustrates magnetic fringing fields generated by the motor of FIGS. 1–2; andIG. 6 illustrates magnetic fringing fields generated by the motor of FIGS. 3–4.

Motor 10 of FIGS. 1, 2 generates fringing magnetic fields 100 as shown in FIG. 5 (shown as just a few magnetic field lines, for purposes of illustration). Fields 100 expand away from the top 11 of the motor 10, through the center pole piece 18, and about voice coil 14 to impinge on the read/write head of the tape drive. The read/write head resides illustratively between points A and B of FIG. 5. Fringing fields 100 generated approximately 40 Orsted at the bottom B of the read/write head.

As stated in the background, it is desirable to reduce the fringing fields 100 and yet keep the same form/fit of the motor 10. The invention in its preferred embodiment thus takes the form of the motor 110 of FIG. 3 and FIG. 4.

Figure 3:
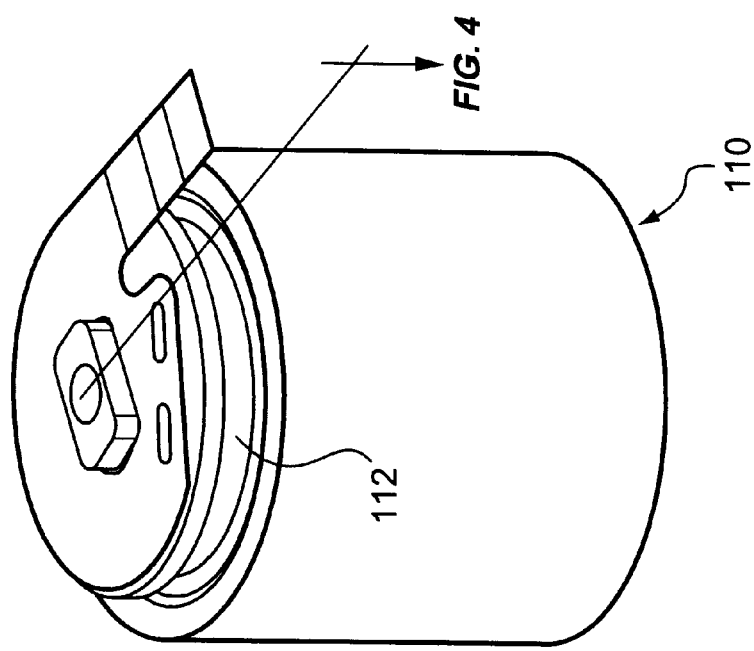
FIG. 3 shows a perspective view of a voice coil motor constructed according to the invention.
Figure 4:
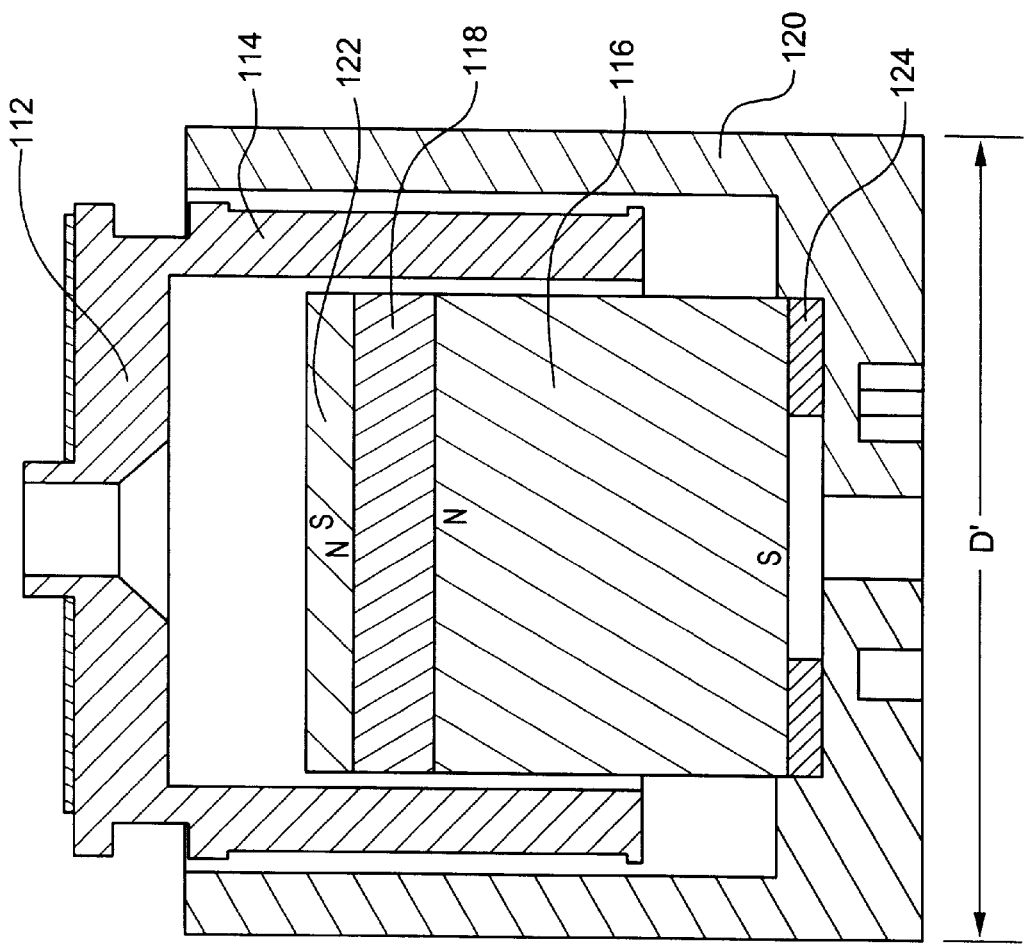
FIG. 4 shows a cross-sectional view of the motor of FIG. 3.
Figure 6:
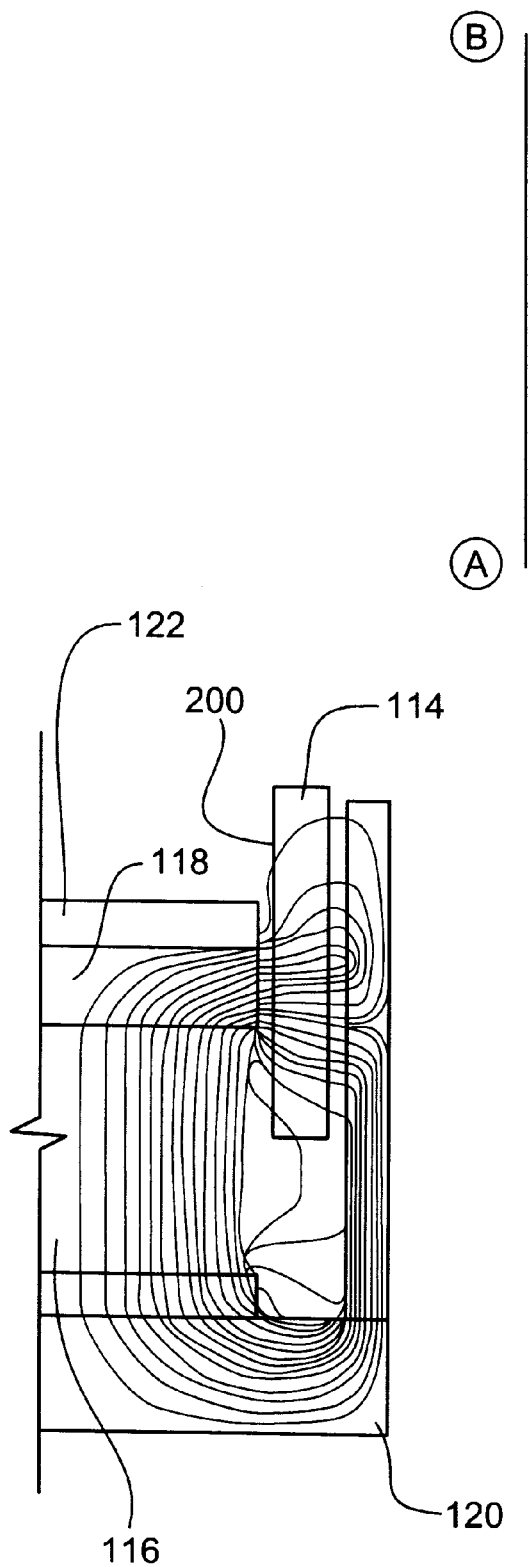

FIG. 3 shows a perspective view of a voice coil motor 110, constructed according to the invention, that provides linear actuation in a tape drive system. FIG. 4 shows a cross-sectional view of motor 110. Motor 110 includes a voice coil bobbin 112 with a winding shown as voice coil 114. Motor 110 is cylindrical in shape, with a diameter D' of approximately one inch, and is surrounded by the outer pole and housing 120. The main magnet 116 resides in the middle of cylindrical motor 110, and is capped by center pole piece 118. An auxiliary magnet 122 is applied to the top of the pole piece 118 to create a magnetic field that substantially cancels fields through the center pole piece 118, as illustrated in FIG. 6. Note that the magnetic polarization of main magnet 116 is north (N) to the top; and the auxiliary magnet has the reverse polarization, with north (N) to the bottom. Those skilled in the art should appreciate that both magnets 116, 122 can be flipped to provide the same effect in canceling fringing magnetic fields.

Specifically, FIG. 6 shows that motor 110 of FIGS. 3,4 generates fringing magnetic fields 200 (shown as just a few lines, for purposes of illustration) that are essentially self-contained with motor 110. Fields 200 pass through center pole piece 118, skirting auxiliary magnet 122, wrap about voice coil 114, and substantially avoid the read/write head of the tape drive. As above, the read/write head resides illustratively between points A and B of FIG. 6. Fringing fields 200 generate approximately 2 Orsted at the bottom B of the read/write head, which is well within desired guidelines.

With leakage fields 200 reduced as in FIG. 6, the main magnet 116 can be made smaller than magnet 16, FIG. 2. The outer pole and housing is also extended from the design of FIG. 2 such that it circumferentially surrounds voice coil 114, as illustrated in FIG. 4, to better collect extraneous fringing fields 200.

Figure 7:
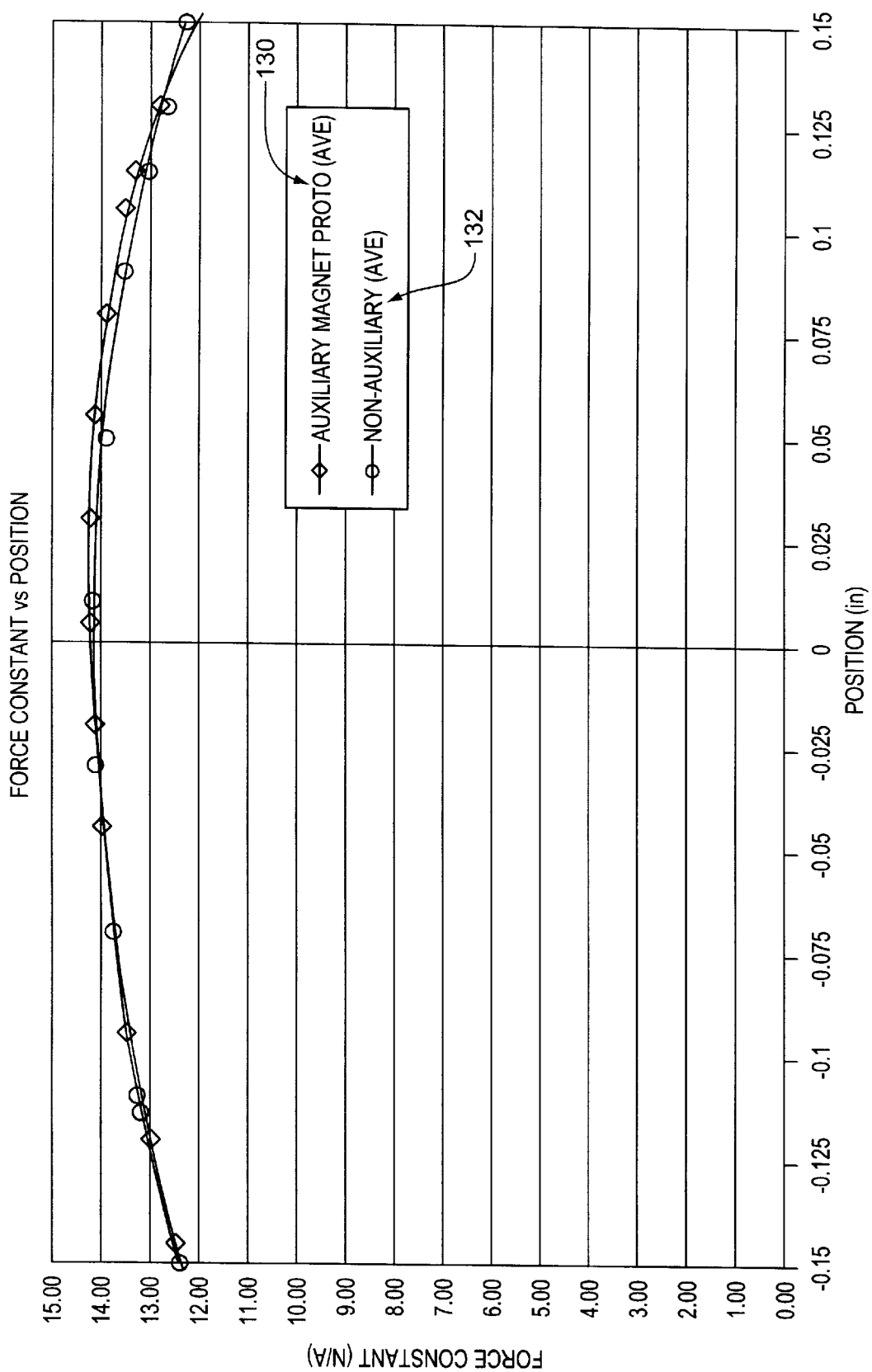
FIG. 7 graphically depicts the force constant versus bobbin position for the motor of FIG. 2 and the motor of FIG. 4.

FIG. 4 also shows a non-necessary element in the form of a non-magnetic spacer 124. Spacer 124 alters the force constant (Newtons) generated by motor 110 so that it has substantially the same force constant of motor 10. More particularly, the amplitude of the current through the winding on voice coil 114 causes a vertical force on bobbin 112. As shown in FIG. 7, one amp in the voice coil generates approximately 14 Newtons in upward force in the bobbin. The magnet 116 and spacer 124 configuration make this upward force similar to the upward force generated by motor 10, so that the corresponding motor drive for motor 10 can also drive motor 110.

Those skilled in the art should however realize that element 124 is not needed. A similar force constant can be achieved by adjustment of the various dimensions and characteristics of magnet 116. As a function of bobbin position, motor 110 has a force constant profile 130 as shown in FIG. 7. Motor 10, likewise, has a force constant profile of 132, FIG. 7, as a function of bobbin position. Data 130, 132 are substantially similar.

The form/fit of motor 110 is also substantially the same as motor 10. Accordingly, motor 110 can be used in existing tape drive systems that use motor 10, with improved performance. In operation, actuation by motor 110 serves to move the tape vertically as a user selects play and record options.

The invention thus provides certain advantages over the art. First, the fringing fields originating from the motor 110 are substantially reduced as compared to motor 10. Further, the invention of FIGS. 3, 4 provides translational linear travel of approximately 0.300 inch, which is suitable for recording to two bands on a tape of the 9840 tape drive system, for example, which moves between band, each at approximately 0.013 inch with about 250 mils of spacing between. Two bands provide more tracks per inch and thus have certain advantages, such as shown with the success of the 9840 "Eagle" tape drive by Storage Technology.

The invention thus attains the objects set forth above, among those apparent from preceding description. Since certain changes may be made in the above systems and methods without departing from the scope of the invention, it is intended that all matter contained in the above description or shown in the accompanying drawing be interpreted as illustrative and not in a limiting sense.

In view of the foregoing, what is claimed is:

1. In a voice coil linear actuator of the type that includes a bobbin connected to a voice coil, a center pole piece, a main magnet, and an outer pole and housing, the improvement comprising:

an auxiliary magnet constructed and arranged for attachment to the center pole piece such that the center pole piece is sandwiched between the auxiliary magnet and the main magnet, the main magnet having a first magnetic polarization adjacent to the center pole piece at a first end of the main magnet, the auxiliary magnet having a second magnetic polarization adjacent the center pole piece, wherein fringing fields from the auxiliary magnet substantially cancel fringing fields from the main magnet such that all fringing fields from the actuator are substantially contained with the actuator.

2. In an actuator of claim 1, the further improvement wherein the first magnetic polarization has a North orientation and the second magnetic polarization has a North orientation.

3. In an actuator of claim 1, the further improvement comprising a non-magnetic spacer coupled to a second end of the main magnet, the spacer altering the force exerted by the bobbin as a function of current through the winding.

4. A voice coil actuator, comprising:

a substantially cylindrical outer pole and housing having a first hollow interior along a force axis; a substantially cylindrical voice coil having a winding about a second hollow interior and axially disposed along the force axis in the first hollow interior; a substantially cylindrical main magnet axially disposed along both interiors, the main magnet having a first end with a first magnetic polarization and a second end with a second magnetic polarization; a substantially cylindrical center pole piece adjacent the first end of the main magnet and axially disposed along both interiors; a substantially cylindrical auxiliary magnet axially disposed along both interiors and adjacent to the center pole piece, wherein the pole piece separates the auxiliary magnet from the main magnet, a bobbin connected to the voice coil for translation with the voice coil along the force axis, wherein current through the voice coil generates a force on the bobbin along the force axis, magnetic fringing fields from the auxiliary magnet and the main magnet being substantially canceled external to the actuator.

5. A voice coil actuator of claim 4, wherein the magnetic fringing fields external to the actuator are less than about two Orsted.

6. A voice coil actuator of claim 4, further comprising a substantially cylindrical non-magnetic spacer disposed in the first interior and adjacent the second end of the main magnet.

7. A voice coil actuator of claim 6, wherein the main magnet, auxiliary magnet and non-magnetic spacer are constructed and arranged to generate a force, via the bobbin, of approximately 14 Newton/inch for one amp of current in the voice coil.

8. A voice coil actuator of claim 4, wherein the bobbin travels at least about 0.270 inch along the force axis in response to current within the voice coil.

9. A method for attenuating external magnetic fringing fields of a voice coil linear actuator that moves a bobbin along a force axis, comprising the steps of:

shielding a main magnet within the actuator with an auxiliary magnet disposed between the bobbin and the main magnet; and extending an outer pole housing of the actuator to shield windings of the voice coil.

10. A method of claim 9, further comprising shortening the main magnet and installing a non-magnetic spacer to provide shim to the shortened main magnet and to generate a substantially equivalent force as generated from an unmodified voice coil actuator without the auxiliary magnet.

11. A method of claim 9, further comprising translating the bobbin at least about 0.270 inch without substantial increase in the fringing fields external to the actuator.

* * * * *